F. W. BARKER.
RECEPTACLE COVER AND FASTENER THEREFOR.
APPLICATION FILED NOV. 15, 1915.
1,211,384. Patented Jan. 9, 1917.
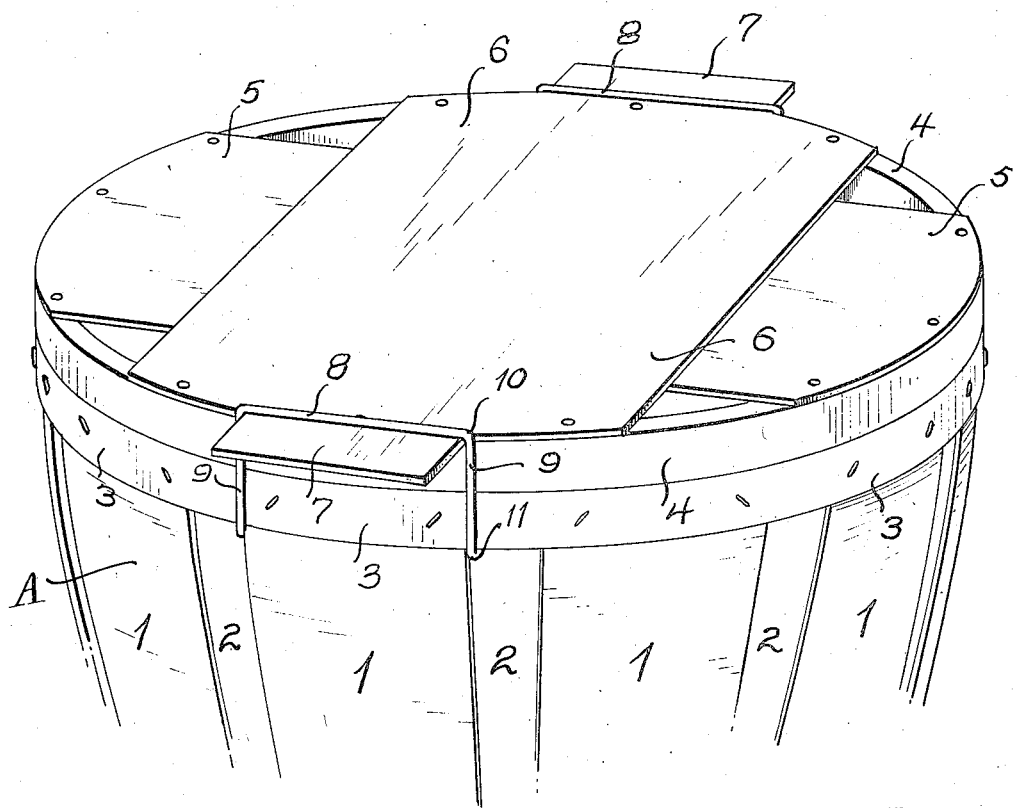
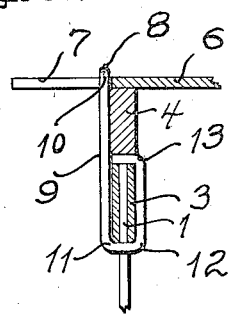
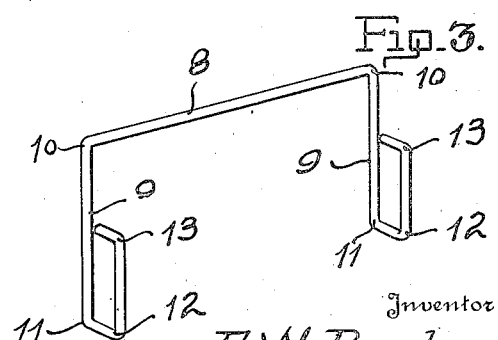

UNITED STATES PATENT OFFICE.

FREDRICK W. BARKER, OF COOPERS PLAINS, NEW YORK.

RECEPTACLE-COVER AND FASTENER THEREFOR.

1,211,384.	Specification of Letters Patent.	Patented Jan. 9, 1917.

Application filed November 15, 1915. Serial No. 61,645.

*To all whom it may concern:*

Be it known that I, FREDRICK W. BARKER, a citizen of the United States, residing at Coopers Plains, in the county of Steuben and State of New York, have invented certain new and useful Improvements in Receptacle-Covers and Fasteners Therefor, of which the following is a specification.

This invention relates to a receptacle-cover and fastener therefor which is especially adapted for use in connection with shipping baskets or crates, wherein its use enables the shipper to readily seal the receptacle to prevent depredation of the contents.

The primary object of the invention is to produce a simple and cheap cover and fastener therefor for shipping receptacles, such as peach baskets which may be quickly and easily applied before the receptacle leaves the factory.

In the practical embodiment of the device, the principal feature of the invention resides in producing a cover which is provided with a slat which extends diametrically of the cover, the outer ends of which project beyond the outer edges of the cover in order that they may be passed through suitable staples which are carried by and suitably secured to the opposite sides of the rim of the basket.

A further feature of the invention resides in the manner of securing the staples to the rim of the basket in order to prevent their displacement or removal from the cover which they retain, to which end staples are adapted to project vertically on the outside of the basket rim and preferably positioned in order that their ends may be bent under the basket rim on opposite sides of one of the slats of the basket and then bent upon themselves to overlie the inner side of the basket rim and then again bent toward the vertically projecting part of the staple to overlie the top of the basket rim, whereby the extreme ends of the staple will be covered up and sealed by the rim bearing part of the basket cover.

With reference to the accompanying drawings which form a part of this specification—Figure 1 is a perspective view of the upper portion of a basket showing the application of the cover and the fastener therefor; Fig. 2 is a sectional view showing the manner by which the staples are secured to the basket rim, and the manner of securing the projecting end of the cover slat to the staple; Fig. 3 is a perspective view of the staple.

Referring to the drawings in detail, A represents the receptacle which, for the purpose of illustration, is shown as a peach basket constructed in a conventional manner having the usual slats 1 spaced apart to leave openings 2 between them, and having their upper ends securely fixed to the rim member 3. The cover preferably comprises a rim bearing part 4 which is adapted to be seated upon and conform with the rim 3 of the basket. The cover top preferably comprises transverse and longitudinal slats 5 and 6, which extend diametrically across the rim bearing part 4, and to which they are suitably secured. The slat 6 is provided with projecting portions 7 on each of its ends which extend beyond the outer edge of the rim bearing part 4 in order that they may pass through the staples 8 and underlie the portion thereof which is bent on a horizontal plane. It is to be, of course, understood that the staples are securely attached to the rim of the basket before the cover is placed on the basket. As stated, each of the staples 8 are provided with a horizontal portion which overlies the projecting ends 7 of the slat 6. They are further provided with vertical portions 9 which are bent at right angles to the horizontal portions such as at 10, in close proximity to the sides of the projections 7. These vertical portions 9 of the staples are adapted to overlie the outside of both the rim of the basket and the rim bearing part 4 of the cover from where they are again bent, such as at 11, and adapted to pass under the rim of the basket through openings 2 on opposite sides of the slats 1. From this point the ends are bent upon themselves such as at 12 and adapted to overlie the inner side of the rim 3 of the basket when the extreme ends are again bent, such as at 13, and adapted to overlie the top of the rim 3 of the basket and abut against the vertical portions 9. With the staples thus constructed and secured to the basket the cover may be placed on by passing one of the projections 7 through a staple, and then by a suitable manipulation to produce a spreading effect in the rim of the basket, the other projection may be passed through the opposite staple.

I claim:—

1. In a receptacle, the combination of a cover, having a rim provided with transversely and longitudinally arranged slats, the ends of one of said slats constructed to project beyond the outer edge of said cover, a cover fastener comprising a staple adapted to receive an end of the projecting slat and having loops formed at its ends adapted to receive the rim of the receptacle, the extreme end portions overlapping the top of the receptacle rim, said cover rim adapted to bear upon the rim of the receptacle and cover up the extreme ends of said loops which overlie the top of the receptacle rim.

2. In a receptacle, the combination of a cover having a rim adapted to bear on the rim portion of the receptacle and having transversely and longitudinally arranged slats, the ends of one of said slats constructed to project beyond the outer edge of said cover, a cover fastener comprising a pair of staples carried by the receptacle having vertically projecting portions bent on a horizontal plane and having their ends bent to provide loops for receiving the rim of the basket and overlying the inner and outer sides thereof and the bottom and top portions thereof, the vertically projecting portions of said staples being adapted to receive the respective ends of the projecting slat.

The foregoing specification signed at Coopers Plains, New York, this sixth day of November, 1915.

FREDRICK W. BARKER.